April 3, 1934.   J. W. WHALEY   1,953,696
SEAT COVER
Filed Jan. 25, 1930   4 Sheets-Sheet 1
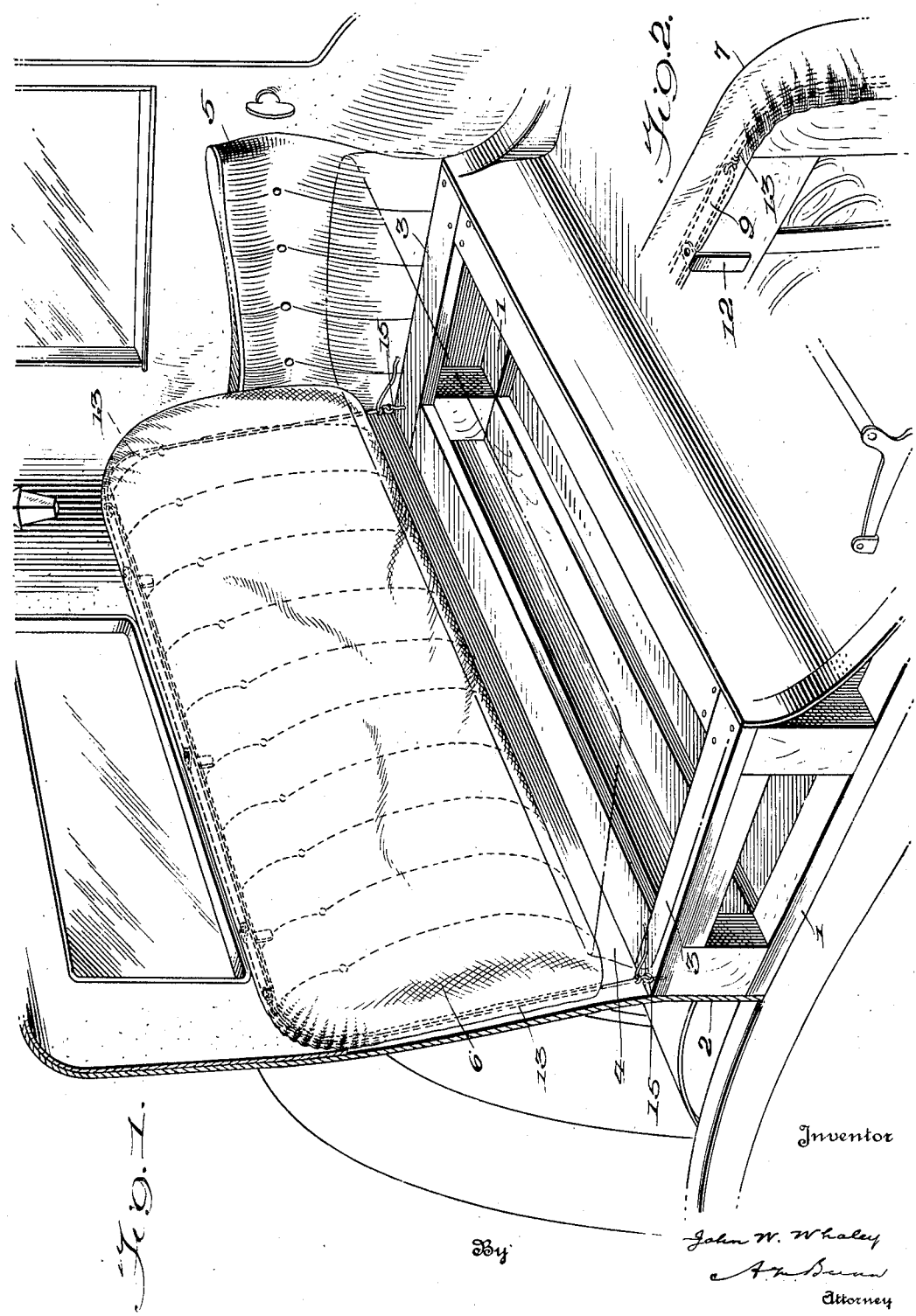
Inventor
John W. Whaley
By
Attorney

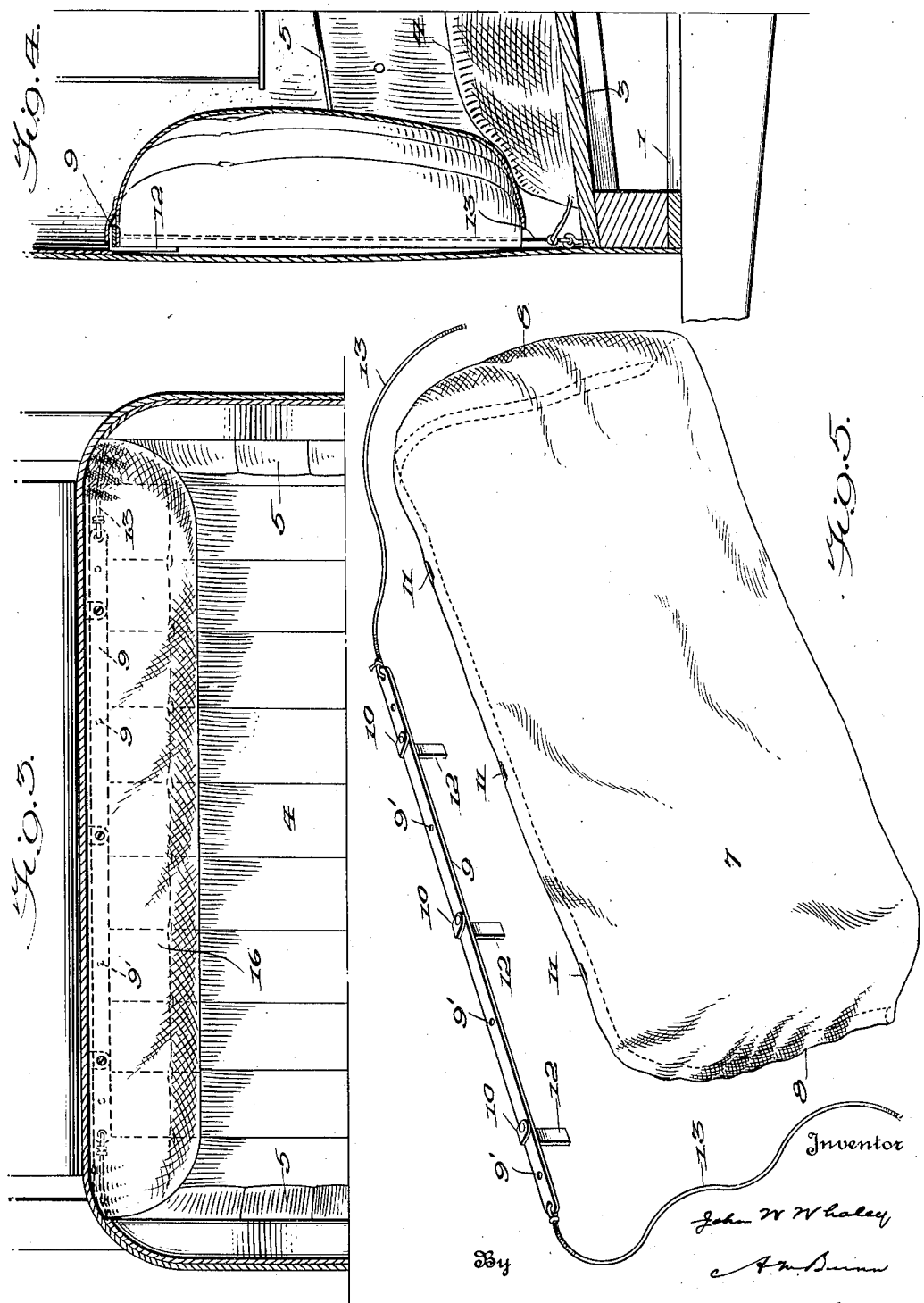

April 3, 1934.  J. W. WHALEY  1,953,696
SEAT COVER
Filed Jan. 25, 1930  4 Sheets-Sheet 3
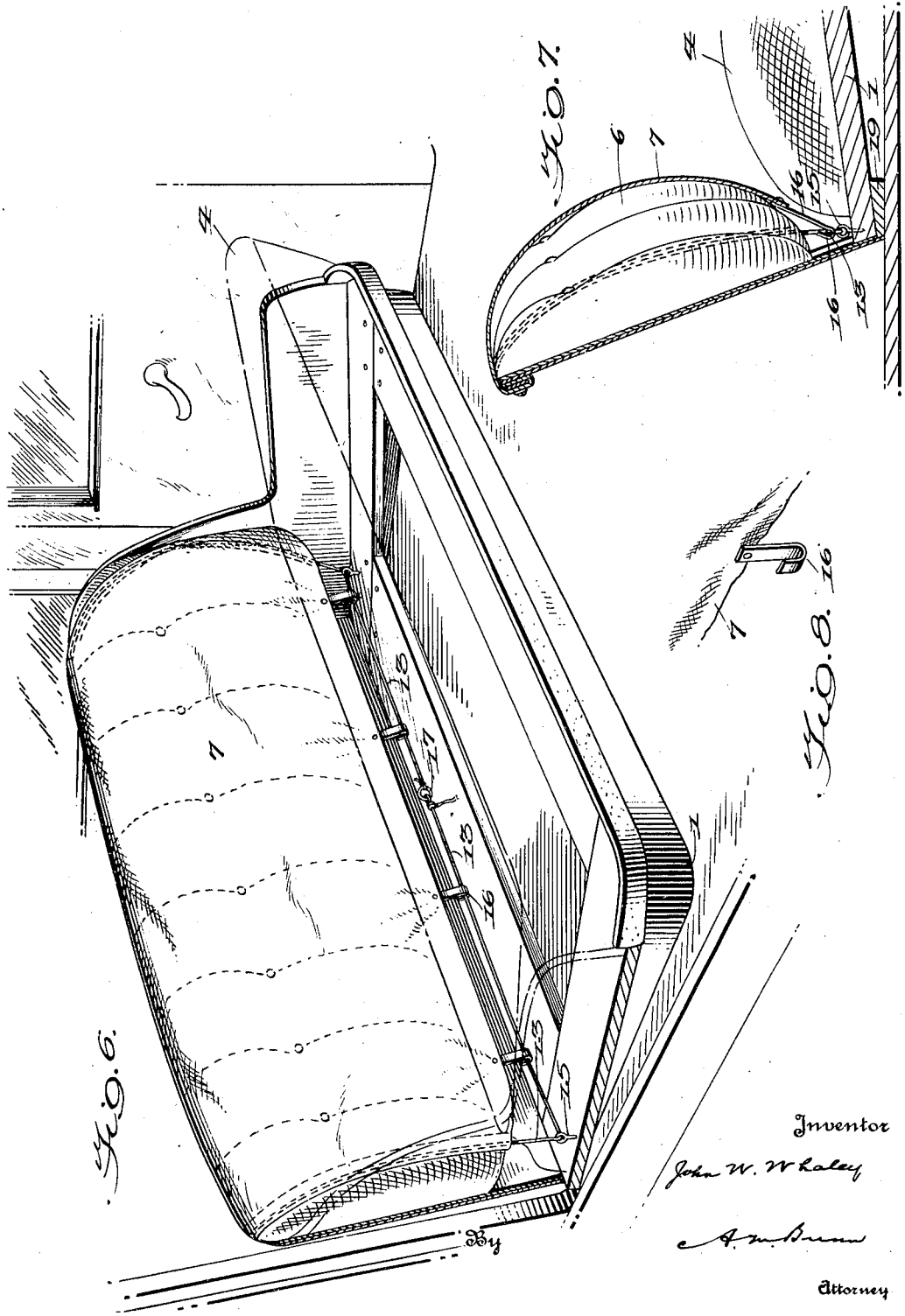

April 3, 1934.  J. W. WHALEY  1,953,696
SEAT COVER
Filed Jan. 25, 1930  4 Sheets-Sheet 4
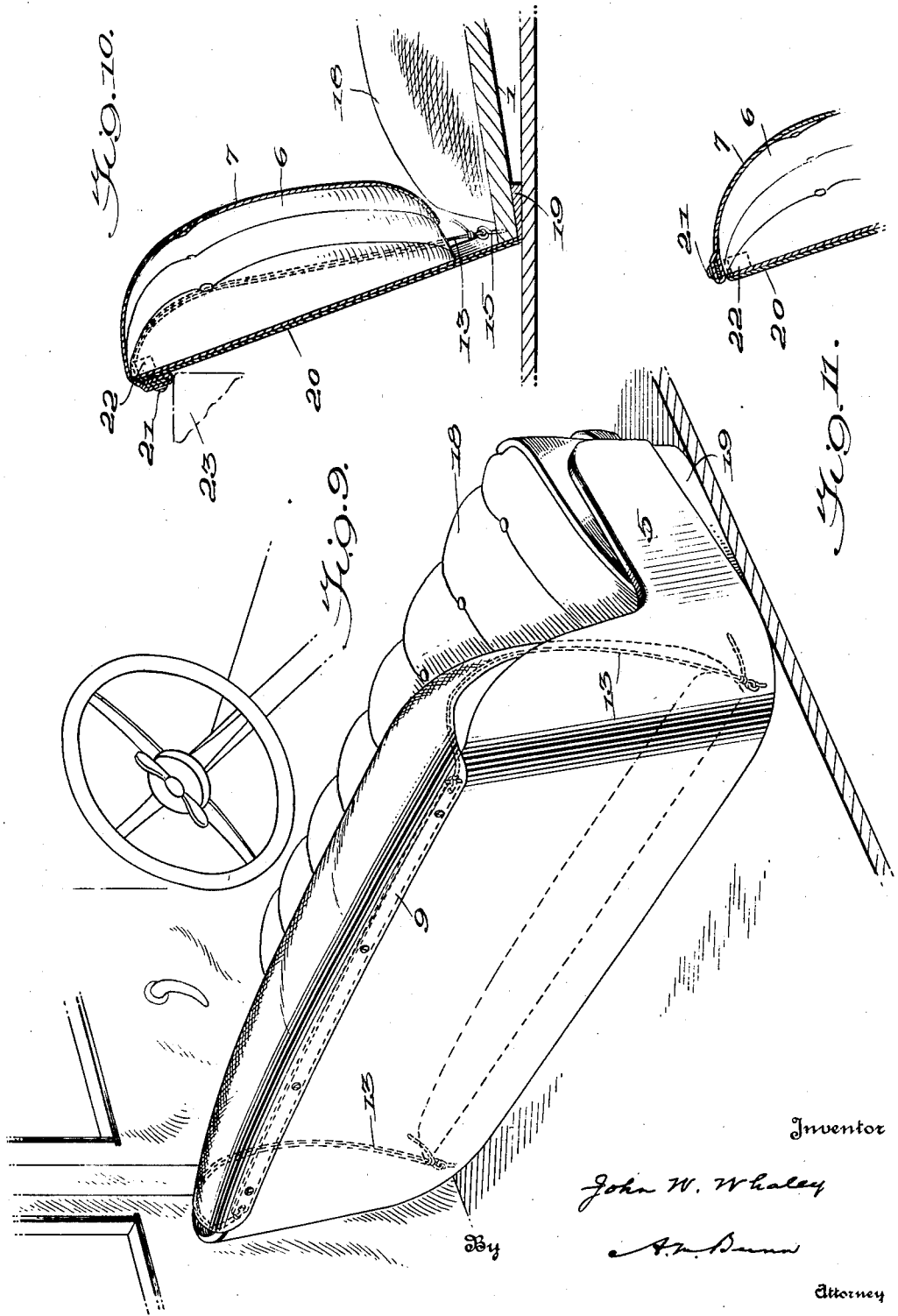

Patented Apr. 3, 1934

1,953,696

UNITED STATES PATENT OFFICE 1,953,696

SEAT COVER

John W. Whaley, Richmond, Va., assignor to Crawford Manufacturing Company, Richmond, Va., a corporation of Virginia Application January 25, 1930, Serial No. 423,455

10 Claims. (Cl. 155—182)

This invention relates to improvements in removable upholstery adapted for use as covers for the front of seat backs of automobiles.

One of the objects of the invention is the provision of a cover for the seat backs so designed and constructed that it is adjustable to any sized back, and therefore adapted for use on the back of the seat of practically any standard make of automobile.

Another object of the invention is the provision of a cover such as described, which may be easily and quickly placed in operative position by the user, or by anyone who is unskilled in the art of applying the covers to the seat back, and in which the detachment of the cover from operative position is as easily effected.

Other objects of the invention will be made apparent in the following specifications, when read in connection with the drawings forming a part of this application.

In said drawings:

Fig. 1 is a perspective view showing a rear seat back fitted with a cover embodying my invention.

Fig. 2 is a fragmentary perspective view showing the rear of the upper right hand corner of the rear seat back.

Fig. 3 is a top plan view looking down upon the rear seat back.

Fig. 4 is a vertical section taken through the rear seat back, the padding not being shown.

Fig. 5 is a dis-assembled perspective view showing the cover and the members which retain it in operative position.

Fig. 6 is a perspective view showing a front seat back fitted with a cover embodying my invention.

Fig. 7 is a cross section taken through Fig. 6.

Fig. 8 is a detail, in perspective, showing one of the retaining members.

Fig. 9 is a perspective view showing the side and rear of the front seat back, with the cover applied.

Fig. 10 is a sectional view taken vertically through Fig. 9, and,

Fig. 11 is a fragmentary sectional detail showing another method of fastening the cover at the top.

Now referring specifically to the drawings, in which like reference numerals indicate like parts throughout the several views, 1 indicates a seat-supporting platform usually secured to the floor of the car in standard automobiles of the present day type. The platform 1 for the rear seat is usually placed in contact with the rear wall 2 of the body of the automobile, and the top portion 3 thereof supports the seat 4, shown in dotted lines, Fig. 1, it being understood that upholstered side panels 5 are provided at each side of the car, lying in substantial contact with the padded ends of the seat 4.

The padded seat back 6 may be of any suitable outside configuration, but, in a very large percentage of such cars as referred to, the rear face of the rear seat back is substantially flat and conforms to the inner configuration of the end wall of the car. It is usually detachably secured to the end wall of the car body, by means of downwardly turned hooks secured to the rear face of the seat back and which register with and enter eyelets or sockets secured to said end wall.

The cover 7 for the rear seat back, in accordance with this invention, may of course be made up of any suitable flexible material, and it is one of the purposes of the invention to so proportion and design the cover that it will be applicable to the rear seat back of any standard make of car. With this end in view the body of the cover is made of a piece of material of sufficient size, both horizontally and vertically, to properly fit over the largest of the seat backs, the vertical sides forming flaps 8, 8, and is further provided with means, to be hereinafter referred to, whereby such flaps 8, 8, may be tightly drawn into the space between the side panels 5, 5, and the contacting padded ends of the seat back 6, and retained in such position, the outer face of the cover 7 lying smoothly and unwrinkled, against the outer surface of the seat back 6.

As clearly illustrated in the drawings, a continuous hem is formed in the top and side portions of the material 7 of the cover, and a flat retaining bar 9, preferably of metal, is mounted within the hem at the top of the cover. Said bar 9 carries a plurality of laterally spaced detents 10, each extending through an opening 11 formed in the hem, and provided with a depending, integrally-formed finger 12, for a purpose to be presently described, and each end of the bar 9 is suitably apertured to receive a strong tape or cord 13. In assembly, the bar 9 is so sewed within the hem that it is centrally mounted therein, the fingers 12 projecting downwardly through the openings 11, and the cords 13 extending outwardly from the ends of the hem at the bottom of the flap portions 8. The bar 9 is then secured within the hem, against lateral sliding movement, by screws or fastening members which extend through the hem and apertures 9' formed in the bar 9, and, when the cover 7, carrying the bar 9, is to be applied to the seat back, it is laid along the top of said back, and the protruding fingers 12 are pushed downwardly into the space between the rear wall of the car and the upper part of the frame of the seat back, as clearly shown in Fig. 4. In this position, since the fingers 12 are of a length such that no downward pull on the cover can change their position, beyond causing them to more tightly press rearwardly against the contacting wall of the car, it is obvious that, when the lower portion of the cover is secured, the entire cover will be in unwrinkled conformity with respect to the front face of the back of the seat. In certain cars, which provide no space between the rear of the seat and the adjacent car wall, the fingers 12 may be removed from the bar and the latter may be screwed to the top of the seat, as shown in Fig. 11.

As best illustrated in Fig. 1, a screw-eyelet or staple 15 is fastened into the top bar of the platform 1, on each side thereof, and substantially in the plane of the rear surface of the seat back frame. After the cover has been placed in position, as heretofore described, the operator pushes the end flaps into the space between the ends of the seat back and the side panels 5, and then threads each of the cords 13 through the proximate eyelet or staple and pulls strongly upon the cord until the adjacent side portion of the cover, or the flap 8, is urged into the space between the padding of the seat back 6 and the adjacent side panel 5, or until the front face of the cover is entirely unwrinkled, and the ends of the cords 13 are then fastened to a portion of the seat supporting frame, as illustrated in Figs. 1 and 4.

It is to be noted that the bar 9 is flat, as here illustrated, and lies upon the top of the seat back, and that it is of a length less than the width of the seat. The rear seat backs are usually rounded at their upper corners, and the cord 13 operates as a continuation of the bar, and, when secured as shown in Fig. 1, the tightly secured cord, and the sides of the cover, conform to the curvature of the corner of the seat back, the material of the cover around the corners being slightly crimped or puckered when in proper position. The stiffening bar 9 is usually of a length adapted to conform to the width of the back of the narrowest seat, the cords 13 being relied upon for providing the extension of the cover around the corner portions, as described. It will therefore be noted that the sheet 7 may be large enough to cover any standard seat back, the flaps 8, 8, always being tucked in between the ends of the cushion and the side panels, and that the cords 13 not only operate as a continuation of the stiffening bar 9, to properly position the cover at the top corners of the seat back, but also tighten the cover across the front of the back, and hold the tucked in flaps, if any, in proper position.

Fig. 6 covers a modification of the flexible tightening cords 13. In this structure, instead of each cord being secured to its proximate eyelet or staple 15, the ends of the cords are run through and extend beyond the latter and are then threaded through retaining hook members 16 carried by the lower margin of the cover 7, where the cords meet centrally of the lower edge of the cushion. One of the cord ends may be equipped with a ring 17 and the end of the other cord is inserted through said ring and pulled very strongly. This action obviously causes an equal and simultaneous pull upon both of the cords 13, and results in each of the side flaps 8 being drawn with equal force into the space between the ends of the cushion and the side panels 5. The free end of one cord 13 is then tied to the ring 17, and the cover is tightly held in operative condition, as will be clearly understood, the fastening elements not only operating to retain the flaps 8, 8, in their proper location, but also tightly drawing and holding the bottom margin of the cover to its lowest position.

Figs. 9, 10, and 11 illustrate the application of the cover 7 to the back of a front automobile seat. In this structure the front seat 18 is supported on a ledge 19 positioned upon the floor of the vehicle, the back 20 extending upwardly at the proper angle. The cover sheet 7 is the same as described for use upon the rear seat, except for dimensions and retaining instrumentalities. In this structure, as in Figs. 1 to 8, the stiffening element 9, with the cords 13 connected thereto are used, but the retaining members 10 and 12 are unnecessary. The bar 9 is non-slidably secured within the top hem and the cords 13, 13 are connected to the ends of the bar and extend through the side hems, and the cover is applied by fastening the bar to the seat by screws 21, passing through the back of the seat near the top thereof, and into the top bar 22, forming a part of the seat frame. The cords 13, 13, are then drawn tightly to stretch the sheet 7, exactly as explained with respect to the structure illustrated in Figs. 1 to 8, and may be fastened as shown in Fig. 1, or as illustrated in Fig. 6.

In some cars of the coupe or roadster type, the rear surface of the seat back is in contact with or secured to a receptacle or ledge 23, as illustrated in Fig. 10, the top edge of the seat back extending above said ledge. In such cases the cover 7 may be extended over the top of the back and secured to the rear upper surface thereof, as shown. In other cars however, where the seat 18 is forwardly and rearwardly movable longitudinally of the car floor, the cover may be fastened to the top edge of the seat as illustrated in Fig. 11.

From the foregoing it will be noted that I have provided a structure for seat back covers whereby a cover sheet of a certain size may be applied to the back of a standard seat of any dimensions, and still present a neat appearance, the flaps 8, 8, merely being extended a greater or less distance into the space between the side panels and the ends of the cushion 6, dependent upon the width of the seat back, as will be understood. This invention not only contemplates a cover which is adjustable to any standard seat, but dispenses with the necessity of any of the fastening members at present in use, such as pins and glove fasteners, all of which have a tendency to become unfastened when in use, often to the damage of the upholstery. Furthermore the cover forming the subject matter of this invention requires no tools, other than a screw driver, for its application to or from operative position, nor is the attention of an expert operator required.

Modifications of the structure herein described may be suggested to those skilled in the art, but my invention covers all embodiments falling fairly within the scope of the appended claims.

I claim:—

1. A cover for seat backs of vehicles comprising a flexible sheet adapted to take the contour of the front of said seat back and having downwardly extending fingers connected thereto at its upper edge, adapted for insertion between the back of the seat and the proximate wall of the vehicle, and a draw cord operatively engaging each side of said sheet.

2. A cover for seat backs of vehicles comprising a flexible sheet adapted to take the contour of the front of said seat back and having downwardly extending fingers connected thereto at its upper edge, adapted for insertion and wedging engagement between the back of the seat and the proximate wall of the vehicle, a draw cord operatively engaging each side of said sheet adapted to be secured adjacent the lower portion of said seat back, to retain the sheet in operative position.

3. A cover for seat backs of vehicles comprising a flexible sheet adapted to take the contour of the front of said seat back and provided with a hem at its top portion and along its depending side edges, a reinforcing bar enclosed by said top hem, means carried by said bar adapted for insertion between the rear surface of the seat back and the proximate wall of said vehicle, and a draw cord extending through each side hem and secured to an end of said bar.

4. A cover for seat backs of vehicles comprising a flexible sheet adapted to take the contour of the front of said seat back and provided with a hem at its top portion and along its depending side edges, a reinforcing bar enclosed by said top hem, means carried by said bar extending outside of said hem, and adapted for insertion between the rear surface of the seat back and the proximate wall of said vehicle, and a draw cord extending through each side hem and secured to an end of said bar.

5. A cover for seat backs of vehicles comprising a flexible sheet adapted to take the contour of the front of the seat back and provided with a hem in its top portion and along its depending side edges, a reinforcing bar enclosed by and nonslidably secured within said top hem and carrying a plurality of downwardly depending fingers, adapted for insertion between the back of the seat and the proximate wall of the vehicle, and a draw cord extending through each of the side hems of said sheet and secured to an end of said bar.

6. A cover for seat backs of vehicles comprising a flexible sheet adapted to take the contour of the front of the seat back and provided with a hem in its top portion and along its depending side edges, a reinforcing bar enclosed by and nonslidably secured within said top hem and carrying a plurality of downwardly depending fingers adapted for insertion between the back of the seat and the proximate wall of the vehicle, and a draw cord extending through each of the side hems of said sheet, each cord having one end attached to said bar, and its other end being adapted to be attached to the lower portion of the seat.

7. The combination with an automobile body wall and an upholstered structure secured thereto of a cover section overlying said upholstered structure and a fastening element secured to an edge portion of said cover section, said fastening element having a prong for insertion between contiguous surfaces of said body wall and said upholstered structure for frictional engagement therebetween.

8. The combination with an automobile body wall and an upholstered structure secured thereto of a cover section overlying said upholstered structure and having a hem in an edge portion thereof, a strain distributing member in said hem and a plurality of fastening elements including prongs carried by said strain distributing member, said prongs being inserted between contiguous surfaces of said upholstered structure and said body wall for frictional engagement therebetween.

9. The combination with an automobile body wall and an upholstered structure secured thereto of a cover section overlying said upholstered structure and having a hem in an edge portion thereof, a strain distributing member in said hem, said hem having a plurality of spaced openings therein, and a plurality of flat metallic securing elements having elongated shanks for insertion between and frictional engagement with contiguous surfaces of said upholstered structure and said body wall, said securing elements also having angularly turned end portions passing through the openings in said hem for direct attachment to said strain distributing member.

10. In combination with an automobile seat back and body portion of an automobile associated therewith, a cover for the seat back comprising a sheet of fabric adapted to cover the seat back, a bar connected with an edge portion of the cover and shaped to conform to and lie on the upper edge of the seat back and provided with prongs for wedging insertion between the seat back and the body portion of the automobile, and means connected to the ends of the bar and engageable with the end portions of the seat back for attaching the bar thereto.

JOHN W. WHALEY.